United States Patent [19]
Zeifang

[11] 4,090,774
[45] May 23, 1978

[54] PRISM ARRANGEMENT FOR SCANNING INFRARED IMAGES

[75] Inventor: Günter Zeifang, Neckargemund, Germany

[73] Assignee: Eltro GmbH & Co., Heidelberg, Germany

[21] Appl. No.: 750,090

[22] Filed: Aug. 5, 1968

[30] Foreign Application Priority Data
Aug. 3, 1967 Germany ............................ 1734521

[51] Int. Cl.² ............................................. G02B 27/17
[52] U.S. Cl. ............................ 350/6.4; 350/285; 350/286; 250/334; 250/347
[58] Field of Search ............................ 350/285, 286, 6; 178/7.1 E, 7.6; 250/347, 334

[56] References Cited
U.S. PATENT DOCUMENTS

| | | | |
|---|---|---|---|
| 2,222,937 | 11/1940 | Dimmick | 178/7.6 |
| 2,967,211 | 1/1961 | Blackstone et al. | 178/7.6 |
| 3,016,464 | 1/1962 | Bailey | 350/6 X |
| 3,320,019 | 5/1967 | Brunelle et al. | 350/286 |

*Primary Examiner*—S. C. Buczinski
*Attorney, Agent, or Firm*—Haseltine, Lake & Waters

[57] ABSTRACT

The invention provides a particular prism arrangement suitable for use between a source of infrared image and a receiving element suitable for receiving infrared radiation. The prism provides for a line scanning of the image and for this purpose is provided with side faces suitably arranged to provide for the scanning of a multiplicity of lines.

8 Claims, 12 Drawing Figures

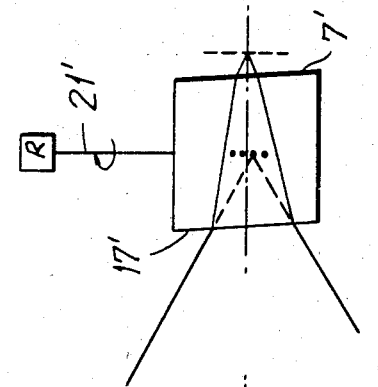
FIG.5(a)
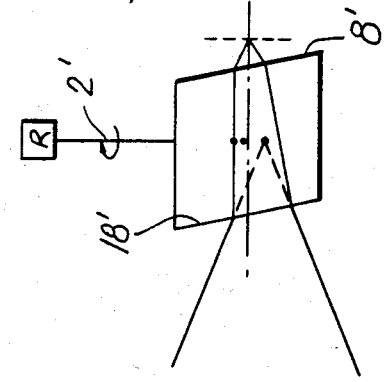
FIG.5(b)
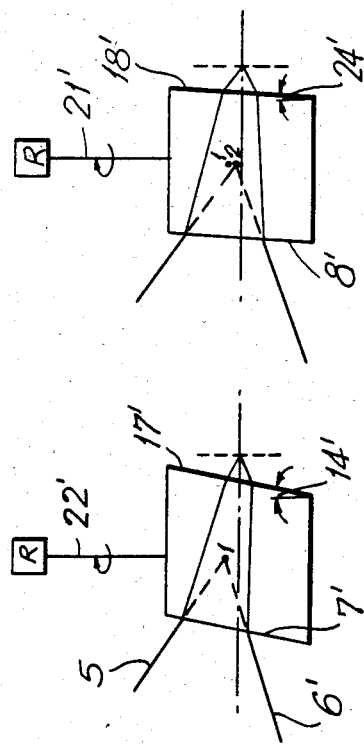
FIG.5(c)
FIG.5(d)
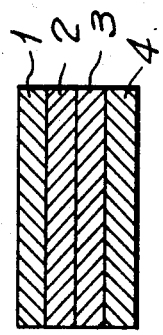
FIG.6

PRISM ARRANGEMENT FOR SCANNING INFRARED IMAGES

DRAWING

FIG. 1 illustrates the general arrangement of a rotating scanning prism viewed transversely to the optical and to the rotary axes;

FIGS. 2a–c illustrate a scanning prism viewed in the direction of the axis of rotation;

FIGS. 3a,b illustrate a scanning prism with opposite faces inclined against each other, viewed transversely to the optical and rotational axes;

FIG. 4 illustrate the scanning pattern scanned after one revolution of a prism according to FIG. 3;

FIGS. 5a–d illustrate a scanning prism having parallel pairs of opposite faces viewed transversely to the optical and rotational axes; and FIG. 6 illustrates a pattern scanned after one revolution of the prism according to FIG. 5.

DETAILED DESCRIPTION

Figure 1:
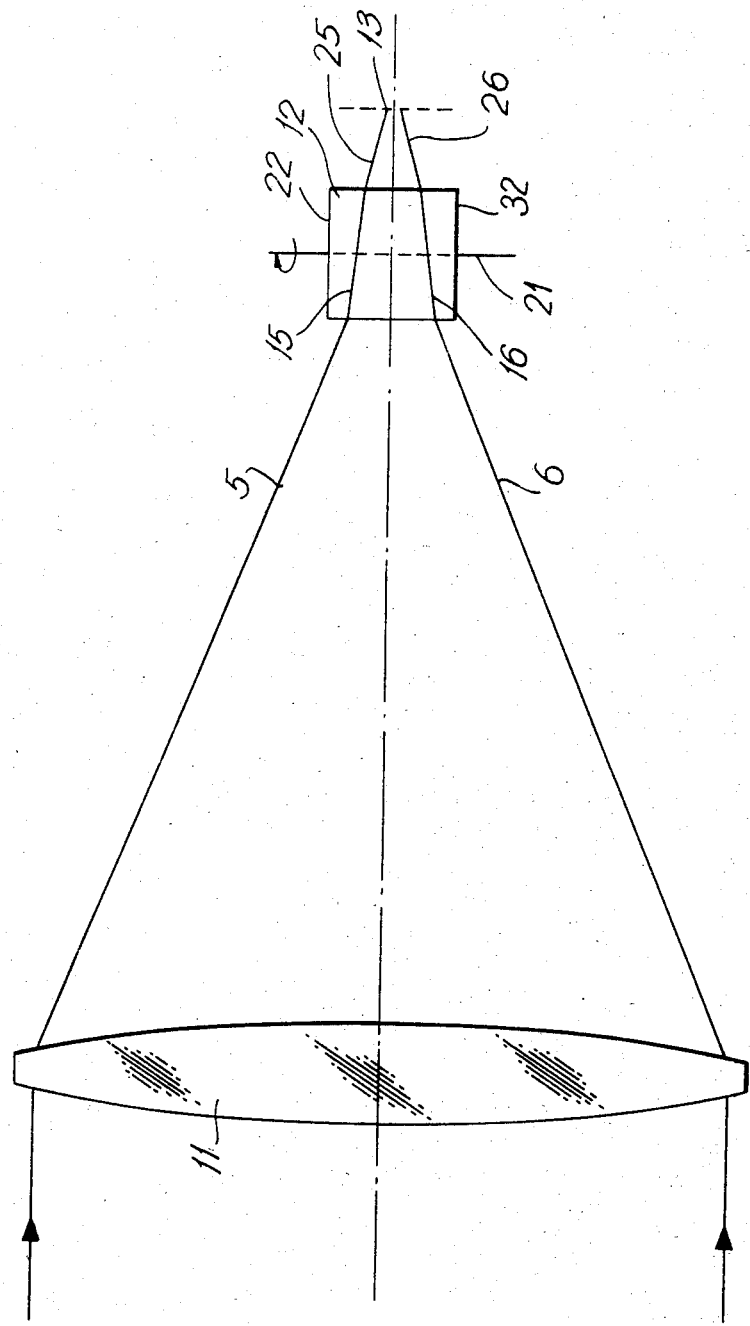

This invention relates to devices for scanning IR images, especially thermal images, by utilization of a series of receiving elements. For this purpose there can be used a method as set forth in copending application Ser. No. 766,381 filed Oct. 8, 1968, now abandoned, (based on German application E 34,343 VIIIa/21a1) and assigned to the same assignee.

The method of the aforesaid application strives to maintain the frame rate as moderate as possible in consideration of narrow bandwidth and of the long time constant of some of the receiving elements.

More particularly, the method according to the aforesaid application provides improved means for the scanning of IR images while holding the image sequence frequency to the minimum possible, taking into account the narrow bandwidth and the sometimes considerable time constant of the receiving elements, and concomitantly striving to display a stationary, flicker-free image on a CRT screen.

A method is known for scanning IR images by means of a group of receiving elements arranged one immediately below the other, in which method the image is passed over the group of receiving elements by a scanning movement of an optical-mechanical system, and a multiple-line image is generated by the individual receiving elements.

Such a method necessitates a considerable number of individual elements and a correspondingly significant expenditure for electronics if, for a given screen size, a good picture quality with a sufficient line resolution is to be realized.

It is an object of said application to provide, for a postulated image sequence frequency, an appropriate relationship between the number of receiving elements employed, the bandwidth of the system and the most favorable number of lines.

The method according to said application involves using receiving elements arranged in a series to receive an image portion in each scanning cycle and in putting together the image portions successively received to form a whole image, by using each receiving element for scanning several lines in succession.

In this arrangement, the receiving elements are placed at a distance from each other which corresponds to an integral multiple of the line-to-line distance.

The number of the receiving elements and the number of lines to be scanned by each receiving element are advantageously chosen in such a manner that the number of partial images will correspond to the requirements of the bandwidth, to the number of the image spots to be transmitted in the time unit, and to the scanning frequency.

The method of said application has the advantage that, for a given number of lines, the number of receiving elements can be significantly reduced. This makes it possible, depending on the time constants of the receiving elements, to find a useful compromise between the expenditure for a mechanical scanning device and the expenditure for the associated electronics.

Advantageously, since the partial images are nested, a decrease of the scintillation effect in the image production is simultaneously obtained.

The method of the aforesaid application can be further improved if, according to a feature of the invention, the advance and reverse movements of the line scanner are used for the scanning of different lines.

This makes it possible to reduce by half the number of full scanning cycles performed, each of which consists of one advance and one reverse movement of the mechanical optics system, under otherwise identical conditions, or to double the number of scanning operations without increasing the number of full scanning cycles.

The utilization of the advance and reverse movements of the line scanner for scanning different lines in one scanning cycle, can be realized in a simple manner by having the line scanner execute a tilting movement, in a plane normal to the line, at the end of its advance course, and having it tilt in the opposite direction at the end of its reverse movement.

Devices are known as indicated above in which IR images are scanned by means of a series of receiving elements in vertically stacked arrangement. For this purpose, the scanning movement of the mechanical-optical system conveys the picture to a series of receiving elements and, depending upon the number of receiving elements, a multiple line image is created. If a four-sided prism is used, one series of receiving elements can be scanned four times by each revolution of the prism. However, this arrangement requires one individual element per line to be scanned, i.e. a considerable number of individual elements is necessary for obtaining a picture to any degree satisfactory.

An object of the invention is to provide a scanning system such that a relatively reduced number of receiving elements will suffice without necessitating essential size reduction of the picture area and/or causing any appreciable deterioration of the picture quality.

According to the invention, a device is proposed for use in the aforesaid method, which is characterized by a rotating prism, whose axis of rotation is parallel to the series of receiving elements, and whose lateral surfaces are inclined at various angles to the axis of rotation.

The invention makes it possible to scan several lines instead of one for each revolution of the prism so that, for otherwise equal conditions, the number of receiving elements can be reduced.

This object can be attained most simply if the outer prism surfaces are inclined to the axis of rotation in such a manner that by the transition from one outer prism surface to another, different lines are scanned in an arrangement whereby in one full rotation all lines pertaining to one receiver cell are scanned.

For the application of a line shifting method in which two lines are covered twice per rotation and per receiving element, a four-sided prism is particularly suitable, in which every two opposite faces have the same angle of inclination relative to the axis of rotation, but in opposite senses, whereas the end faces, normal to the axis of rotation, are squares.

If two opposite faces are parallel to each other but inclined at an angle to the axis of rotation, then a four-sided prism will scan each of four lines once in each rotation.

If it is desired to scan three or more than four lines simultaneously, it is necessary to use a prism having an even number of sides greater than four, for example, a hexagonal prism. In this case, the outer faces must be shaped in such a manner that both faces of each pair of opposite faces are inclined at the same angle to the axis of rotation, either in parallel or in the opposite sense.

In the figures of the drawing, the prism positions and the scanning operation are represented schematically.

In FIG. 1 the input optical system is diagrammatically designated at 11. Scanning is effected in the convergent beam path by an optical prism 12 rotating on an axis 21. The end faces of the prism, normally transverse to the axis of rotation, are designated as 22 and 32. A series of receiving elements 13 are arranged behind the prism. The convergent beams 5,6 are deflected in the directions 15 and 16 at their entry into the prism, and in the directions 25 and 26 at their exit from the prism.

Figure 2C:
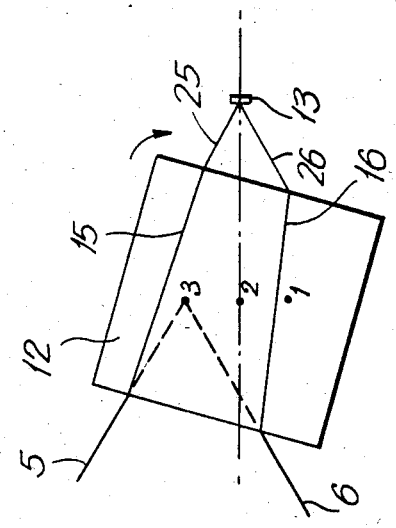
Figure 2B:
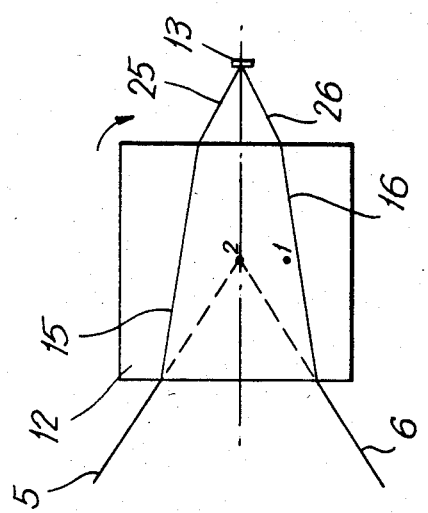
Figure 2A:
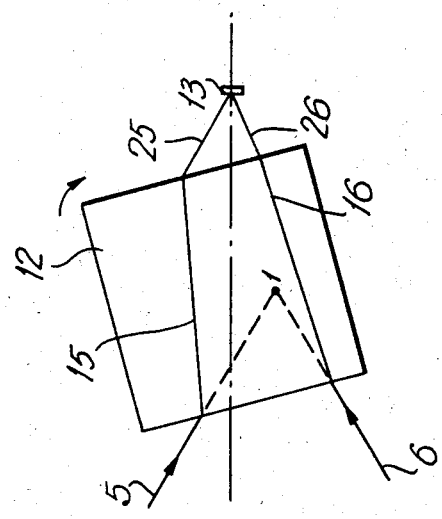

In FIG. 2 three different positions of the prism are shown for a scanning operation at right angles to the series of receiving elements, which are designated as a, b and c. The prism is of regular shape, i.e. its end faces are squares, and its lateral faces are rectangular and normal to the end faces. Points 1, 2 and 3 designate individual image spots which are covered successively by each rotation of the prism. All image spots are located on the same line, which is thus scanned four times by each revolution of the four-sided prism.

Figure 3B:
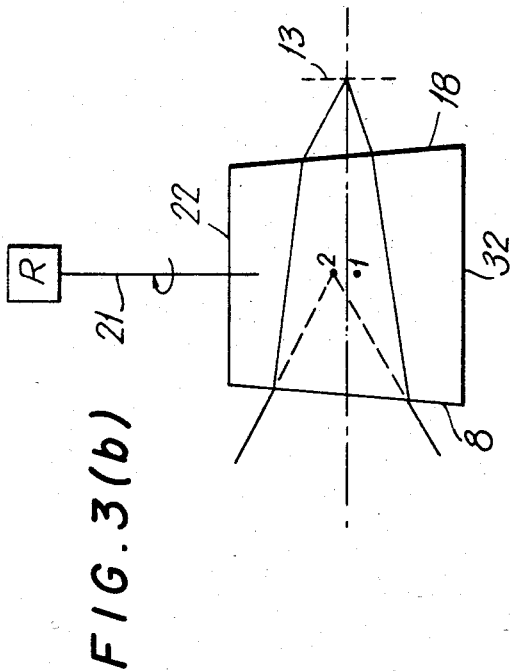

In FIG. 3, the side faces 7 and 17 (and 8 and 18), which in the embodiment of FIG. 2 were parallel to the rotational axis 21, are no longer parallel either to the axis of rotation with which they now form a very narrow angle $\alpha$, nor to each other, since each pair of opposite faces 7 and 17 or 8 and 18 are inclined in opposite senses relative to the axis of rotation.

Figure 3A:
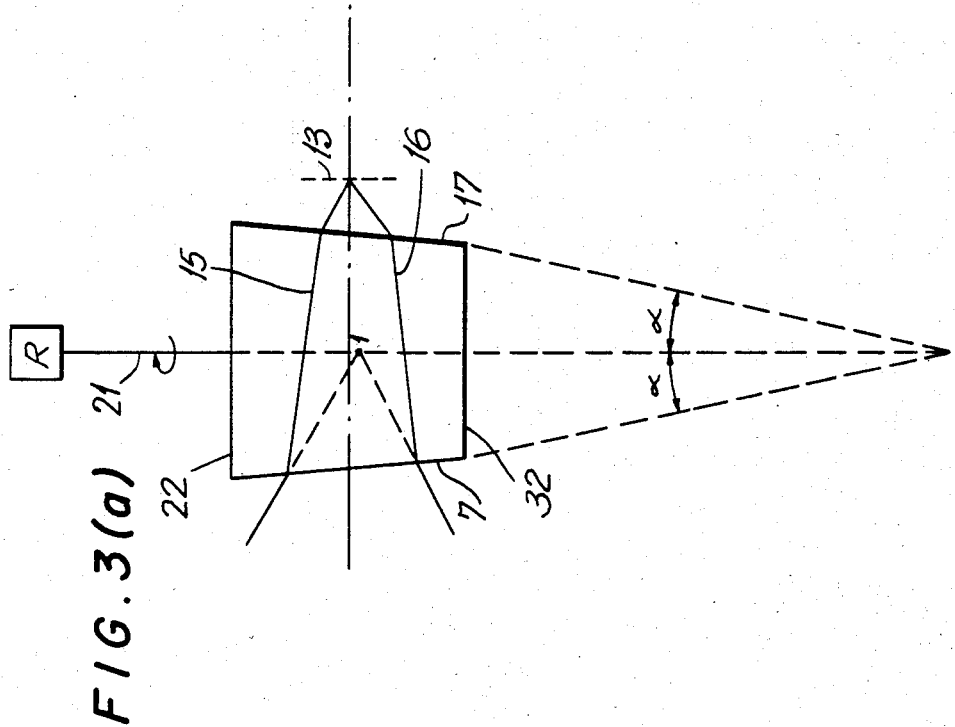
Figure 4:
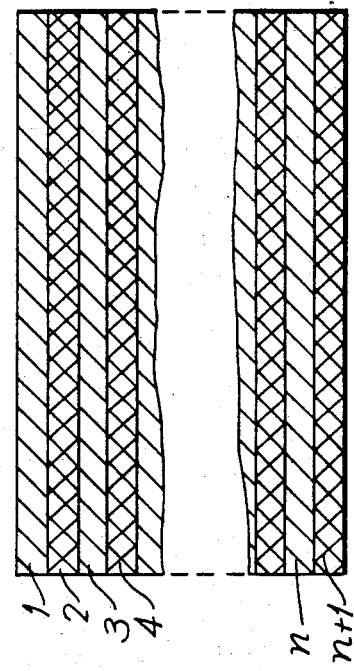

According to FIG. 4, each receiving element can scan two lines per prism rotation. Since the angles formed by the faces 7 and 17 relative to the axis of rotation are equal (as are the angles formed by the faces 8 and 18), there results the same beam path as represented in FIG. 3a, when face 7 is on the right, and face 17 on the left, i.e. after a half rotation of the prism through 180°. The same applies concerning faces 8 and 18 or, to put it differently, for every 180° of rotation of the prism, the same orientation of the side face to the optical axis, and thus the same beam path, is repeated over and over. If the prism position represented in FIG. 3a is designated as I, and the one shifted by 180° as III, the position of FIG. 3b as II, and its 180° counterpart as IV, line 1 of FIG. 4 is scanned by the prism positions I and III, line 2 by the prism positions II and IV, and yet the same receiving element cooperates in all 4 positions. In the same manner, an additional receiving element will scan the lines 3, 4 or 5, 6 respectively.

Another four-sided prism is shown in FIG. 5 except that, contrary to the prism shown in FIG. 3, the two side faces opposite to each other, e.g. 7' and 17' are parallel. The side faces 7' and 17' form an angle 14' with the rotational axis while the faces 8' and 18' form an angle 24'. The angle 14' is such that, in the transit from position I (FIG. 5a) to position III (FIG. 5c) (i.e. a 180° rotation of the prism), two lines are skipped; i.e., if in position I the first line of the picture is being scanned, then the fourth line will be scanned in position III (see also FIG. 6). On the other hand, the angle 24' is so chosen that the line shift between position II (FIG. 5b) and position IV (FIG. 5d) amounts to one line only. If, therefore, the second line was scanned in position II, the third line will be scanned in position IV. If, however, the difference between the angles 14' and 24' is chosen in such a manner that the line shift from position I to position II is also one line, then there will automatically result a shift of one line also for each of the transitions from position II to position III and position III to position IV. Thus, the lines 1–4 in FIG. 6 are always scanned in the positions indicated by the Roman numerals, in the sequence 1, 2, 4, 3.

The prisms can be rotated on their respective axes by any suitable means indicated diagrammatically as element R in FIGS. 3 and 5.

What is claimed is:

1. Apparatus for line scanning an image comprising means for producing a convergent beam path of a plurality of lines, an optical prism in said beam path for scanning and optical transmission of said lines to a series of spaced optically sensitive receiving elements, and means to rotate said prism on an axis parallel to said series to scan said lines, said prism having side faces through which the optical scanning and transmission is effected, which side faces are disposed at different angles relative to said axis such that by transition of said beam from one of said side faces to the next there is effected parallel shifting of the light rays through said faces from one line to another.

2. Apparatus as claimed in claim 1 wherein two pairs of opposite side surfaces are provided, and with respect to said axis the angles of the faces of one pair are different from the angles of the faces of the other pair.

3. Apparatus as claimed in claim 2 wherein the faces in each pair are parallel.

4. Apparatus as claimed in claim 2, wherein the side faces of an opposite pair thereof are parallel.

5. Apparatus as claimed in claim 1, wherein the side faces of an opposite pair thereof are angularly related.

6. Apparatus as claimed in claim 1, wherein the side faces of an opposite pair thereof are inclined at the same angle to said axis.

7. Apparatus as claimed in claim 1, wherein the side faces of an opposite pair thereof are so related that a plurality of parallel contiguous lines are scanned.

8. Apparatus as claimed in claim 1 wherein said prism is a monolithic uniform body.

* * * * *